T. M. PRENTISS.
Portable Fly and Mosquito-Nets.
No. 144,792. Patented Nov. 18, 1873.

Witnesses:
John R. Geard
Myron A. Poole

Inventor:
Thomas M. Prentiss.
by Alban Andrén
his attorney

UNITED STATES PATENT OFFICE.

THOMAS M. PRENTISS, OF BOSTON, MASSACHUSETTS.

IMPROVEMENT IN PORTABLE FLY AND MOSQUITO NETS.

Specification forming part of Letters Patent No. 144,792, dated November 18, 1873; application filed July 21, 1873.

*To all whom it may concern:*

Be it known that I, THOMAS M. PRENTISS, of Boston, in the county of Suffolk and State of Massachusetts, have invented certain new and useful Improvements in Portable Fly and Mosquito Nets; and I do hereby declare the following to be a full, clear, and exact description of the invention, such as will enable others skilled in the art to which it pertains to make and use it, reference being had to the accompanying drawings, which form part of this specification.

My invention relates to a new, and useful, and portable mosquito and fly net, for the purpose of preventing mosquitoes and other insects from annoying people who reside in neighborhoods infected with such insects. My invention also serves as a sun-shade, so as to protect people from the direct rays of the sun. This, my invention, consists in an umbrella, sun-shade, or similar article covered with suitable gauze or netting. To the lower edge of the sun-shade, umbrella, &c., is secured a similar netting of ample dimensions, so that one or more persons can be protected under it. The height of the netting may be made so that the lower edge thereof shall reach the ground when the person who carries it is standing.

Figure 1:
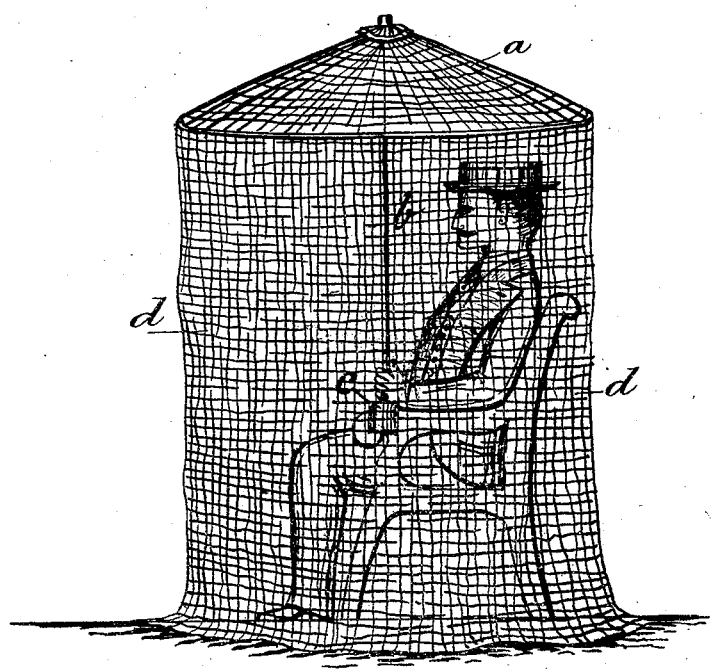
Figure 2:

In the drawing, Figure 1 represents a side view of my invention when open for use, and Fig. 2 represents a plan of the same as folded together for transportation.

*a* in Fig. 1 represents an ordinary sun-shade, umbrella, or similar device, provided with a suitable covering made of cloth, paper, &c., over which is attached a cover of gauze or netting for the purpose of preventing flies, mosquitoes, &c., from passing through any holes or crevices in the paper or cloth covering of the sun-shade or umbrella. The umbrella *a* is provided with a handle, *b*, the lower end of which can be placed in a suitable socket, *c*, attached to a chair, seat, or settee, as shown in Fig. 1; or the person using the mosquito-net can hold it in his hand, so as to carry it with him when moving about from place to place. To the lower edge of the umbrella *a* is secured a continuous piece of netting or gauze, *d*, that is made full enough so as to envelop one or more persons, as may be desired. The height of the gauze or netting *d* is made so that the lower edge of said netting is resting on the ground when the person holding it is standing or walking, so as to prevent mosquitoes, flies, &c., from entering the net from beneath the lower edge thereof.

An advantage of my invention is that it can be folded together in a very small compass for transportation, as shown in Fig. 2, occupying about as large space as an ordinary short umbrella.

Mosquito-nets heretofore made have not been provided with any protection from the sun, and could, therefore, not be used out of doors in the day-time, except under a suitable cover, whereas my invention can be used to equal advantage out of doors, as well as under a shade, or indoors, as may be desired.

Another advantage of the covered top *a* is that dew or moisture will not fall down upon the person protected by my improved mosquito-net.

I am aware that canopies have been constructed with spreading arms, both rigid and folding, but I do not claim such a construction; but

Having thus fully described the nature and operation of my invention, I wish to secure by Letters Patent and claim—

In combination with an ordinary umbrella, a gauze curtain extending down from its outer edge, as and for the purpose substantially as described.

In testimony that I claim the foregoing I have hereunto set my hand this 11th day of July, 1873.

THOMAS M. PRENTISS.

Witnesses:
ALBAN ANDRÉN,
JOHN R. HEARD.